US008654893B2

(12) United States Patent
Dateki

(10) Patent No.: US 8,654,893 B2
(45) Date of Patent: Feb. 18, 2014

(54) COMMUNICATION DEVICE AND CHANNEL ESTIMATION METHOD

(75) Inventor: Takashi Dateki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 804 days.

(21) Appl. No.: 12/213,906

(22) Filed: Jun. 26, 2008

(65) Prior Publication Data

US 2008/0267320 A1 Oct. 30, 2008

Related U.S. Application Data

(63) Continuation of application No. PCT/JP2005/024110, filed on Dec. 28, 2005.

(51) Int. Cl.
*H03K 9/00* (2006.01)
*H04L 27/00* (2006.01)

(52) U.S. Cl.
USPC .......................... 375/316; 375/260; 375/267

(58) Field of Classification Search
USPC .................. 375/148, 260, 267, 316
See application file for complete search history.

(56) References Cited

U.S. PATENT DOCUMENTS

| 7,551,545 | B2 * | 6/2009 | Krishnamoorthi | 370/206 |
| 7,684,503 | B2 * | 3/2010 | Hayashi | 375/260 |
| 7,796,681 | B1 * | 9/2010 | Narasimhan et al. | 375/148 |
| 2004/0091057 | A1 | 5/2004 | Yoshida | |
| 2005/0249181 | A1 * | 11/2005 | Vijayan et al. | 370/344 |
| 2009/0213950 | A1 * | 8/2009 | Gorokhov et al. | 375/260 |

FOREIGN PATENT DOCUMENTS

| JP | 2004-159084 | 6/2004 |
| JP | 2004-208254 | 7/2004 |
| JP | 2004-266814 | 9/2004 |
| WO | 2005/064870 | 7/2005 |

OTHER PUBLICATIONS

Jan-Jaap van de Beek et al., "On Channel Estimation in OFDM Systems", Vehicular Technology Conference, 1995 IEEE 45th, vol. 2, pp. 815-819; Jul. 5-Jul. 28, 1995.
H.Atarashi et al., "Performance of Forward Link Broadband Packet TD-OFCDM with Iterative Channel Estimation" Technical report of IEICE, DSP2000-154, SAT2000-110, RCS2000-186, pp. 85-91; Jan. 2001.
International Preliminary Report on Patentability and Written Opinion, issued by The International Bureau of WIPO for International Application No. PCT/JP2005/024110, Jul. 10, 2008.
The extended European search report includes the supplementary European search report and the European search opinion issued for corresponding European Patent Application No. 05844834.1, dated Sep. 27, 2012.

* cited by examiner

*Primary Examiner* — Chieh M Fan
*Assistant Examiner* — Freshteh N Aghdam
(74) *Attorney, Agent, or Firm* — Myers Wolin, LLC

(57) ABSTRACT

A communication apparatus and a channel estimating method for performing channel estimations with high precision. The communication apparatus, which receives multicarrier signals comprising a plurality of subcarriers, has a first estimating unit that generates temporary channel estimation values from pilot signals located in any ones of a plurality of received subcarriers; a second estimating unit that generates a virtual channel estimation value sequence related to the frequency bands other than the frequency bands of the plurality of subcarriers and that combines the generated virtual channel estimation value sequence with the plurality of temporary channel estimation values to generate a channel estimation value sequence corresponding to a predetermined frequency bandwidth; and a generating unit that uses this generated channel estimation value sequence to generate channel estimation values related to any ones of the plurality of subcarriers.

11 Claims, 15 Drawing Sheets

COMMUNICATION DEVICE AND CHANNEL ESTIMATION METHOD

CROSS-REFERENCE TO RELATED APPLICATION

This is a continuation of Application PCT/JP2005/024110, filed on Dec. 28, 2005, now pending, the contents of which are herein wholly incorporated by reference.

BACKGROUND OF THE INVENTION

1. Field of the Present Invention

The present invention relates to a communication device and a channel estimation method for performing a channel estimation in a multicarrier transmission system.

2. Description of the Related Art

Over the recent years, an OFDM (Orthogonal Frequency Division Multiplexing) system has been adopted for transmission methods of a variety of communication systems, and has realized high-speed data communications at high frequency availability efficiency. The OFDM system is a system of dividing transmission data into plural pieces of data, mapping the divided pieces of transmission data to a plurality of orthogonal carrier waves (subcarriers), and transmitting the data in parallel on a frequency-axis. An OFDM modulation process involves utilizing an Inverse Discrete Fourier Transform (which will hereinafter be abbreviated to IDFT), an Inverse Fast Fourier Transform (which will hereinafter be abbreviated to IFFT), etc, while an OFDM demodulation process involves utilizing a Discrete Fourier Transform (which will hereinafter be abbreviated to DFT) and a Fast Fourier Transform (which will hereinafter be abbreviated to FFT), etc.

Further, the communication system using the OFDM system generally carries out a phase correction due to channel fluctuations and therefore conducts synchronous detection using pilot signals. The synchronous detection using the pilot signals will hereinafter be briefly described.

A transmitting device inserts the pilot signals defined as known signals into data signals, and transmits the signals that are OFDM-modulated based on the IDFT etc. A receiving device, when receiving the signals, outputs the signals of frequency components corresponding to the respective subcarriers through a process such as the DFT from the received signals, and performs the synchronous detection on the basis of the output signals. The receiving device, on the occasion of performing the synchronous detection, estimates (channel estimation) a propagation path characteristic acting on a pilot symbol contained in the output signal from the pilot symbol, and interpolates the data signals based on the acquired channel estimation values. For example, in a case where the phase fluctuation on the propagation path is interpolated, the phase fluctuation is estimated from a reception phase of the pilot signal on the basis of a modulation phase of the known pilot signal, whereby a phase fluctuation of the data signal is interpolated.

In the OFDM system, the channel estimation using the pilot signals is conducted broadly, and it is known that accuracy of the channel estimation value greatly contributes to communication performance related to a reception error rate etc. Then, a variety of techniques have been proposed for this type of channel estimation method.

The simplest channel estimation method is Zero-Forcing (which will hereinafter be abbreviated to ZF). The ZF is a technique that utilizes, directly as the channel estimation value, an estimation value of a temporary Channel Frequency Response (which will hereinafter be abbreviated to CFR) obtained from a correlation between the known pilot signal and the received pilot signal.

Further, a technique, which utilizes as the channel estimation value what the temporary CFR estimation values obtained by the ZF are further averaged on the time-axis and/or the frequency-axis, has been proposed as a technique for raising the accuracy of the channel estimation (refer to Non-Patent document 1). The Non-Patent document 1 discloses, as an OFDM-based channel estimation method, a method of increasing a Signal-to-Noise Ratio (which will hereinafter be abbreviated to SNR) of the channel estimation value by averaging the plurality of subcarriers in the frequency-direction.

Further proposed is a method of converting the temporary CFR estimation values into those in a time domain by use of the IFFT etc, then conducting a process of putting a weight to an acquired-from-the-conversion Channel Impulse Response (which will hereinafter be abbreviated to CIR) (delay profile) in the time domain and removing a noise, and thus utilizing CFR estimation values as the channel estimation values obtained by executing again the FFT (refer to Non-Patent document 2). The Non-Patent document 2 discloses a method of performing the channel estimation in a way that deletes (zero (0) replacement) the time domain with the small SNR by use of such a general property of the propagation path that received power of the CIR acquired in the way described above concentrates on a fixed area on the time-base.

Moreover, the Patent document 1 discloses a method of reducing symbol-to-symbol interference and carrier-to-carrier interference due to delayed waves over a guard interval (GI) in a receiving device based on the OFDM system.

[Patent document 1] Japanese Patent Laid-Open Publication No. 2004-208254

[Non-Patent document 1] [Characteristics of Downlink Broadband Packet TD-OFCDM in the Case of Utilizing Repetitive Channel Estimations] written by Shin, Abeta and Sawahashi, Singaku Gihou RCS2000-186, The Institute of Electronics, Information and Communication Engineers, January in 2001.

[Non-Patent document 2] Jan-Jaap van de Beek, O. Edfors, M. Sandell, [On Channel Estimation in OFDM Systems], Vehicular Technology Conference, 1995IEEE45th Volume 2, 25-28 Jul. 1995, P. 815-819

The method of raising the accuracy of the channel estimation by averaging the temporary CFR estimation values, i.e., the estimation method using an averaging in the frequency domain, has a problem that the channel estimation can not be done with the high accuracy because of being disabled to properly average if a delay dispersion is large.

Further, the channel estimation method of putting the weight on the CIR in the time domain and removing the noise etc has such a problem that since the CIR has a spread in the time domain, the process for removing the noise etc as by weighting, zero-replacement and zero-addition causes a distortion of the signal component, resulting in a decline of accuracy of the channel estimation. For example, as described above, in the method of deleting the time domain with the small SNR in the CIR, generally the received power of the CIR does not concentrate entirely on a fixed time domain but has a spread to some extent in the time domain with the result that the spread signal components might be removed together with the noise components, and therefore a problem is that it is impossible to perform the channel estimation with the high accuracy in the time domain with the high SNR.

SUMMARY OF THE INVENTION

The present invention, which was devised in view of the problems described above, aims at providing a communication device and a channel estimation method for performing channel estimation with high accuracy.

The present invention adopts the following configurations in order to solve the problems given above. Namely, the present invention is a communication device receiving a multicarrier signal having a plurality of subcarriers, the communication device comprising: a first estimating unit generating temporary channel estimation values from pilot signals located in any ones of the plurality of received subcarriers based on known information on pilot signals; a second estimating unit generating a virtual channel estimation value sequence related to frequency bands other than frequency bands of the plurality of subcarriers, and generating a channel estimation value sequence corresponding to a predetermined frequency bandwidth by combining the generated virtual channel estimation value sequence with the plurality of temporary channel estimation values; and a generating unit generating channel estimation values related to any ones of the plurality of subcarriers by use of the channel estimation value sequence generated by the second estimating unit.

According to the present invention, a propagation path characteristic acting on the pilot signals is simply estimated based on known information (a phase, an amplitude, etc) on the pilot signals known to the communication device from the pilot signals contained in the received multicarrier signals (the first estimating unit).

Subsequently, in addition to the plurality of temporary channel estimation values corresponding to the plurality of pilot signals, which are acquired by the simple estimation, there is generated the virtual channel estimation value sequence related to the frequency bands other than the frequency bands of the plurality of subcarriers. An assumption herein is that the channel estimation value sequence denotes a series of plural channel estimation values arranged based on a predetermined condition, and embraces an implication of waveforms representing the plurality of channel estimation values or an implication of functions thereof. Then, the channel estimation value sequence corresponding to the predetermined frequency bandwidth is generated by combining the virtual channel estimation value sequence with the plurality of temporary channel estimation values.

A predetermined arithmetic operation is conducted about the thus-generated channel estimation value sequence, thereby generating the final channel estimation values. Thus, the final channel estimation values are generated based on the information combined with the virtual channel estimation value sequence, whereby the highly-accurate channel estimation values can be generated.

Moreover, according to the present invention, the communication device may further comprise: a converting unit frequency-time-converting the channel estimation value sequence generated by the second estimating unit into channel impulse response information in a time domain; and a processing unit executing a predetermined weighting process and/or a predetermined correcting process with respect to the channel impulse response information, wherein the generating unit may generate the channel estimation values related to any ones of the plurality of subcarriers by time-frequency-converting the channel impulse response information processed by the processing unit.

According to the present invention, the generated channel estimation value sequence is converted into the channel impulse response information (a delay profile) in the time domain by the converting unit, is treated with the predetermined process by the processing unit, and is converted again back into the information in the frequency domain by the generating unit, thereby generating the final channel estimation values. Herein, the frequency-time conversion involves using, e.g., the IDFT, the IFFT, etc, and the time-frequency conversion involves using, e.g., the DFT, the FFT, etc.

Further, the predetermined weighting process by the processing unit includes a variety of processes such as zero-replacement for setting the power under a predetermined level to zero and a process of removing the noise component, and further the predetermined correcting process includes such an interpolating process etc as to enable acquisition of the channel estimation values corresponding to all the subcarriers when the pilot signals are allocated to not all the subcarriers but some subcarriers.

Hence, according to the present invention, the channel estimation value sequence combined with the virtual channel estimation value sequence undergoes the frequency-time conversion, and it is therefore possible to restrain a spread, on the time-axis, of the post-converting channel impulse response information. With this scheme, the signal components affected by the process such as the weighting process executed about the channel impulse response information can be reduced, and, when converted again back into the information in the frequency domain, the highly-accurate channel estimation values can be generated.

Moreover, on the occasion of generating the highly-accurate channel estimation values, it is sufficient to simply generate the virtual channel estimation value sequence, and hence it follows that the highly-accurate channel estimation values can be generated with a small amount of throughput.

Further, the second estimating unit may generate the virtual channel estimation value sequence so that the channel estimation value sequence corresponding to the predetermined frequency bandwidth has substantially-coincident channel estimation values with respect to the maximum and minimum frequency bands in the channel estimation value sequence, and forms a waveform that is smoothly continuous on the whole on a frequency-axis.

Thus, it is feasible to further restrain the spread, on the time-axis, of the channel impulse response information after the frequency-time conversion by generating the virtual channel estimation value sequence, and, by extension, the channel estimation values having the high accuracy can be generated.

Furthermore, for generating the highly-accurate channel estimation values, the second estimating unit has the following unit in order for the channel estimation value sequence to form the smoothly continuous waveform as a whole on the frequency-axis.

To be specific, the second estimating unit may set, as start points, the temporary channel estimation values of the maximum and minimum frequency bands of the corresponding subcarriers in the plurality of temporary channel estimation values on the frequency-axis, then generate two tangential lines extending in directions of the frequency bands other than the frequency bands of the plurality of subcarriers, and generate the virtual channel estimation value sequence so that the virtual channel estimation values are arranged on the waveform generated by multiplying the two generated tangential lines by a window function.

With this scheme, the waveforms extending from the temporary channel estimation values of the maximum and minimum frequency bands of the corresponding subcarriers in the plurality of temporary channel estimation values, i.e., the waveforms with alignment of the virtual channel estimation values to be generated can be formed as the smoothly continuous waveforms.

Note that a variety of methods are considered as methods of generating the tangential line. For instance, the available tangential lines are a tangential line that directly connects the respective temporary channel estimation values of maximum and minimum frequency bands of the subcarriers and a tangential line having a predetermined gradient.

Further, each gradient of the tangential line may be obtained based on the temporary channel estimation value within the predetermined frequency bandwidth on the frequency-axis from each starting port.

With this scheme, the tangential line having the gradient, which is formed by the temporary channel estimation values, can be generated based on the temporary channel estimation values with respect to the frequency bands within a predetermined width from each of the maximum and minimum frequency bands of the corresponding subcarriers in the plurality of temporary channel estimation values. For example, the gradient to be calculated may be set as an average gradient of the temporary channel estimation values related to the frequency bands within the predetermined width. The waveform with the alignment of the virtual channel estimation values to be generated can be thereby formed as the smoothly continuous waveform.

It should be noted that the present invention can be realized by way of a channel estimation method having the same characteristics as the communication device according to the present invention has, and a program for making an information processing device (a computer) function as the communication device, or a recording medium recorded with the program.

Furthermore, the communication devices according to the present invention may be communication devices that performs wireless communications or wired communications with each other, and may also be devices, elements, etc, which perform interface-signal-based communications within the computer.

According to the present invention, it is feasible to provide the communication device and the channel estimation method for conducting the channel estimation with the high accuracy.

DESCRIPTION OF THE PREFERRED EMBODIMENTS

A communication device in an embodiment of the present invention will hereinafter be described with reference to the drawings. Note that in the following discussion, the communication device in the embodiment is to be described in a way that separates the communication device into a receiving device and a transmitting device for explanatory convenience's sake.

The present invention is not, however, limited to this configuration but may embrace a communication device including both of a receiving function and a transmitting function, which will hereinafter be described below. The configuration in the following embodiment is no more than an exemplification, and the present invention is not limited to the configuration in the embodiment.

Further, the communication devices in the embodiment are exemplified by a mobile terminal and a base station device (an access point) that perform wireless communications with each other, and power-line communication devices performing the communications via cables. Moreover, the communication devices may also be devices, elements, etc that conduct interface-signal-based communications within a computer.

[Transmitting Device]

Figure 1:
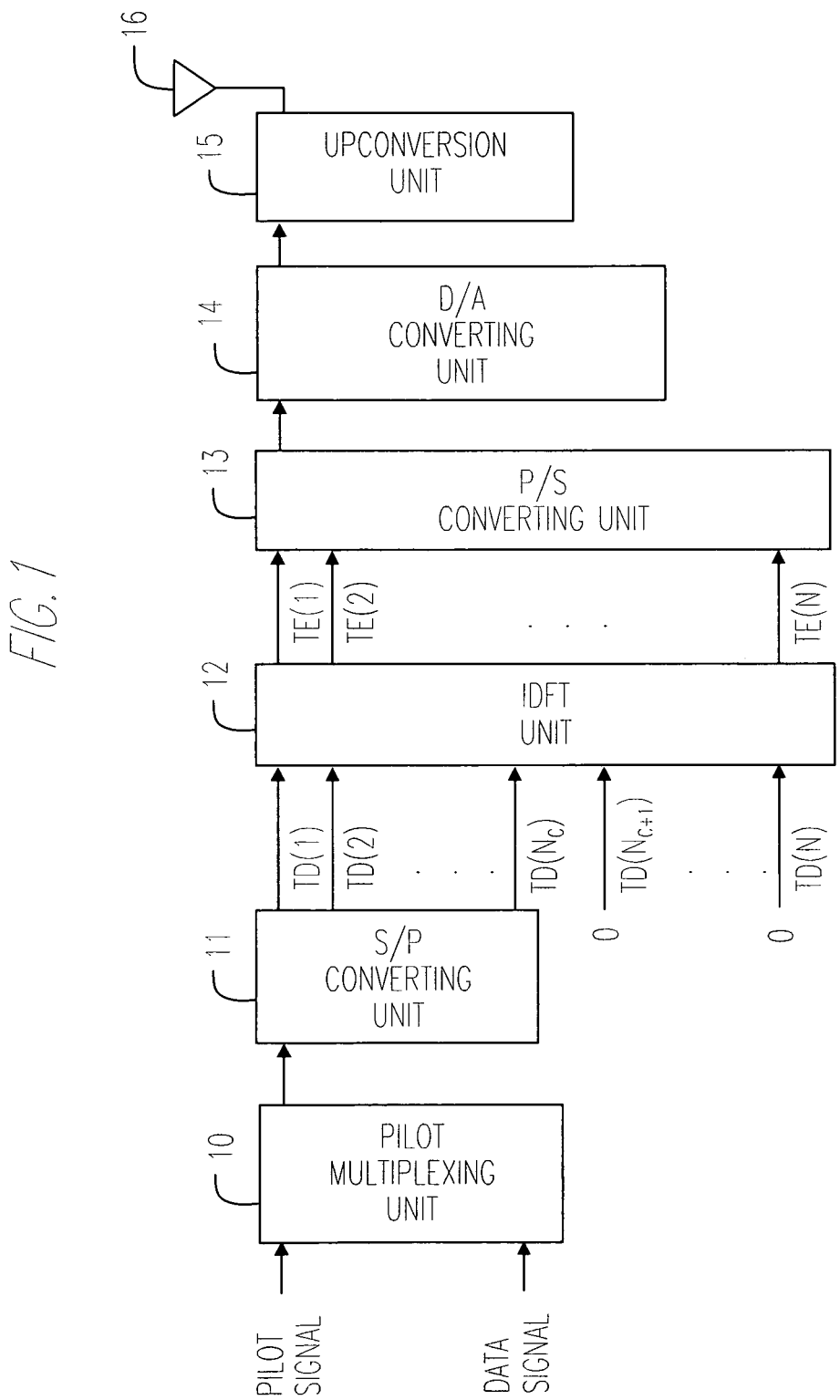
FIG. 1 is a diagram showing a functional configuration of a transmitting device in an embodiment.

Before explaining the receiving device in the embodiment, to begin with, the transmitting device, which transmits the signal received by the receiving device, will be described. A functional configuration of the transmitting device will hereinafter be described with reference to FIG. 1. FIG. 1 is a diagram showing the functional configuration of the transmitting device. It is to be noted that the following functions of the transmitting device is shown as one example of those of the transmitting device based on the OFDM system, and the present invention is not limited to this type of transmitting device.

The transmitting device includes a pilot multiplexing unit 10, a serial/parallel (which will hereinafter be abbreviated to S/P) converting unit 11, an IDFT (Inverse Discrete Fourier Transform) unit 12, a parallel/serial (which will hereinafter be abbreviated to P/S) converting unit 13, a digital/analog (which will hereinafter be abbreviated to D/A) converting unit 14, an up conversion unit 15, and an antenna element 16.

Figure 2:
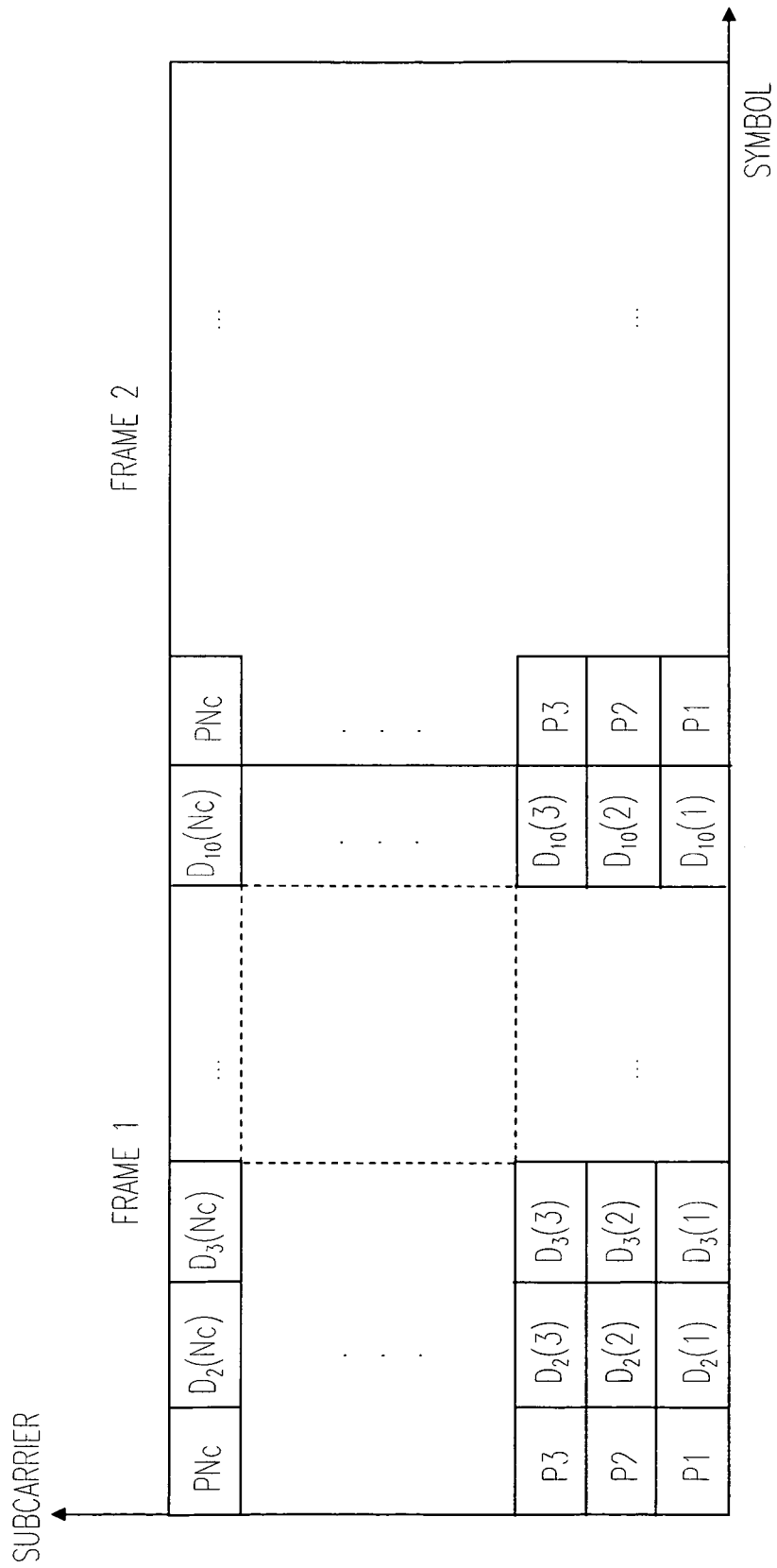
FIG. 2 is a diagram showing an example of a structure of an OFDM frame.

The pilot multiplexing unit 10, when receiving a pilot signal defined as a known signal together with data signals (containing a control signal etc) that should be transmitted, generates a serial signal sequence in which the data signals and the pilot signal are disposed in predetermined positions based on an OFDM frame. Herein, a structure of the OFDM frame will be briefly explained with reference to FIG. 2. FIG. 2 is a diagram illustrating the structure of the OFDM frame in the embodiment.

In the OFDM frame illustrated in FIG. 2, OFDM symbols are disposed on a subcarrier frequency-time array. Each of the OFDM frames in the embodiment is assembled by $N_C$-pieces of subcarriers, each subcarrier further consists of 10 symbols on a time-base, and the pilot signals and the data signals are disposed in the individual subcarriers. It should be noted that the present invention does not limit the OFDM frame to the example illustrated in FIG. 2, and an acceptable scheme is that the pilot signals are disposed in the way of being mixed with the data signals.

A transmission data stream based on the OFDM frame structure described above is, if data disposed in a b-subcarrier of an a-th symbol within one frame is defined as Da(b), expressed as follows.

$D_1(1), D_2(1), \ldots, D_{10}(1),$
$D_1(2), D_2(2), \ldots, D_{10}(2),$
$\ldots,$
$D_1(N_C), D_2(N_C), \ldots, D_{10}(N_C)$ The pilot multiplexing unit 10 allocates pilot symbols, of which the number corresponds to the number of the subcarriers $N_C$, to heads of the respective frames. To be specific, the pilot multiplexing unit 10, as shown in FIG. 2, allocates pilot symbols P1–P $N_C$ to $D_1$ (1–$N_C$) in the transmission data streams, and also allocates data symbols containing the control information etc to areas each ranging from the second symbol to the tenth symbol within the individual frames.

The S/P converting unit 11 converts the serial signal sequence generated by the pilot multiplexing unit 10 into parallel signals arranged in parallel corresponding to the number of the subcarrier count ($N_C$).

The IDFT unit 12 executes an IDFT process on an OFDM symbol basis with respect to the parallel signals output from the S/P converting unit 11. Normally, an IDFT size utilized in this IDFT process is larger than the effective subcarrier count ($N_C$), and hence the IDFT unit 12 sets zero (0) signals in an interval between an ($N_C$+1)th signal and an N-th signal that are subsequent to $N_C$-pieces of inputted parallel signals, and executes the IDFT process about totally N-pieces of parallel signals.

When the N-pieces of parallel signals inputted to the IDFT unit 12 are expressed by TD(1)–TD(N), signals TE(1)–TE(N), on the time-base, of the individual subcarriers output from the IDFT unit 12 can be expressed by the following formula (1). A value corresponding to exp in the formula (1) is stored in a table etc within a memory, and TE(f) can be calculated by a multiplier and an adder.

[Mathematical Expression 1]

$$TE(f) = \frac{1}{\sqrt{N}} \sum_{k=1}^{Nc} TD(k) \times \exp\left(2\pi j \frac{kf}{N}\right) \quad \text{Formula (1)}$$

The signals TE(f), on the time-base, of the subcarriers output from the IDFT unit 12 are synthetically multiplexed by the P/S converting unit 13, then attached with a guard interval (GI) by a guard interval attaching unit (unillustrated) and converted into analog signals by the D/A converting unit 14. A central frequency of the thus-converted analog signals is converted into a radio transmission frequency, and the signals are transmitted from an antenna element 16.

[Receiving Device]

Figure 3:
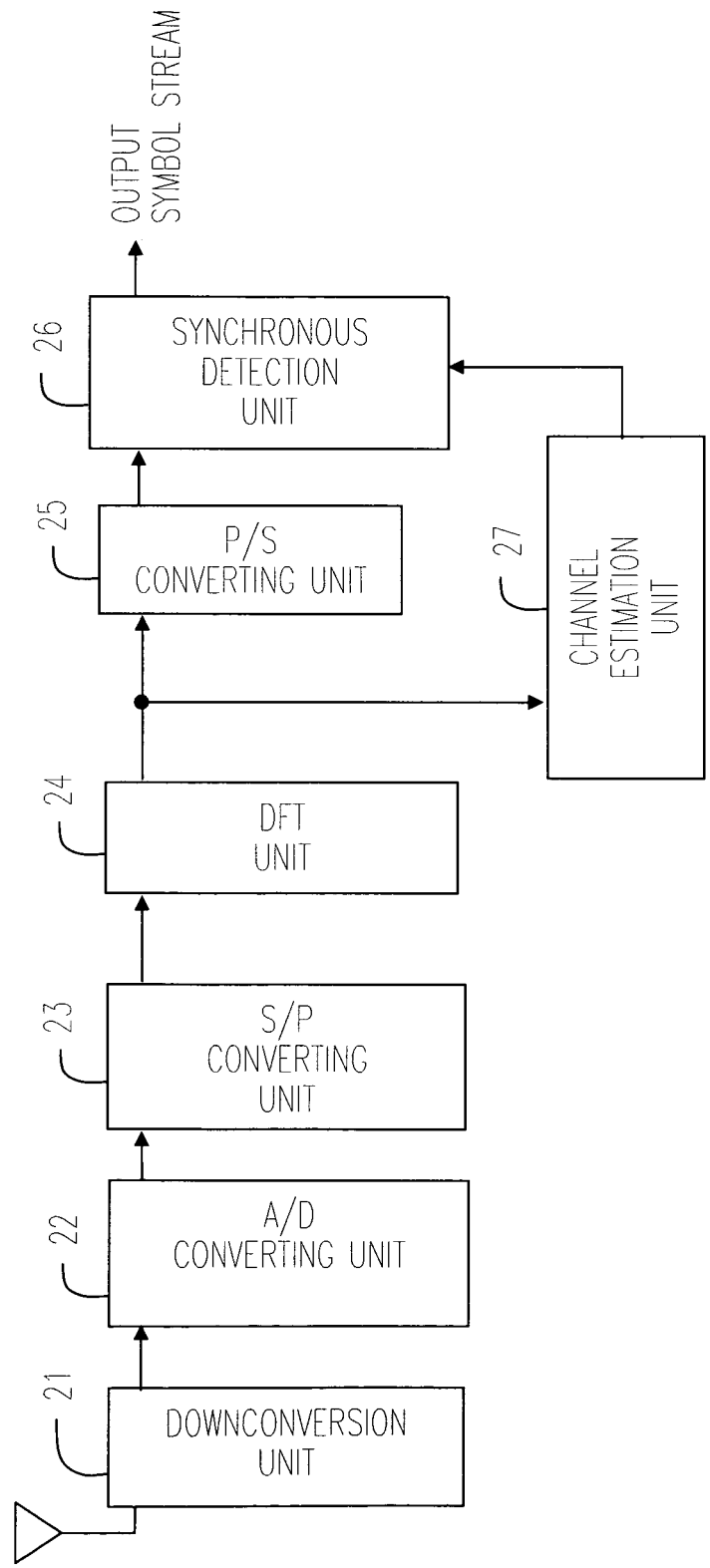
FIG. 3 is a diagram showing a functional configuration of a receiving device in the embodiment.

The receiving device in the embodiment of the present invention will hereinafter be described with reference to FIG. 3. FIG. 3 is a diagram showing a functional configuration of the receiving device in the embodiment.

The receiving device in the embodiment includes down-conversion unit 21, an analog/digital (which will hereinafter be abbreviated to A/D) converting unit 22, an S/P converting unit 23, a DFT unit 24, a P/S converting unit 25, a synchronous detection unit 26, a channel estimation unit 27, etc.

The downconversion unit 21 converts the radio transmission frequency signals received by the antenna element into baseband signals. The baseband signals are, after being converted into digital signals by the A/D converting unit 22, converted by the S/P converting unit 23 into parallel signals of N-samples having the same size as the IDFT size in the transmitting device. Note that the guard intervals (GIs) are removed from the parallel signals at this time.

The DFT unit 24 executes a DFT process with respect to the inputted parallel signals, and outputs N-pieces of signals corresponding to the number of the subcarrier components. A DFT size utilized in the DFT process is the same as the IDFT size utilized in the transmitting device. At this time, the ($N_C$+1)th signal through the N-th signal among the N-pieces of output signals are the zero signals set by the transmitting device and are therefore deleted. These output parallel signals are rearranged in serial signal sequence by the P/S converting unit 25 and then output to the synchronous detection unit 26.

The synchronous detection unit 26 executes synchronous detection of the inputted serial signal train by use of a channel estimation value transferred from the channel estimation unit 27. In the synchronous detection process executed by the synchronous detection unit 26, a corresponding output $z_m(n)$ after the synchronous detection can be expressed by the following formula (2), where $x_m(n)$ is a data signal of a subcarrier m of a symbol n in the frame, and $y_m$ is a channel estimation value of the subcarrier m that is estimated from the pilot signal located at the head of the same frame. Note that a symbol "*" shown in the formula (2) represents a complex conjugate.

[Mathematical Expression 2]

$$z_m(n) = x_m(n) \times y^*_m \quad \text{Formula (2)}$$

The output signal $z_m(n)$ after the synchronous detection is output to a demodulation unit etc.

It is to be noted that the embodiment applies the IDFT to the frequency-time conversion process and the DFT to the time-frequency conversion process, however, the present invention is not limited to these processes, and IFFT may be applied to the frequency-time conversion process, while FFT may be applied to the time-frequency conversion process.

<Channel Estimation Unit>

Figure 4:
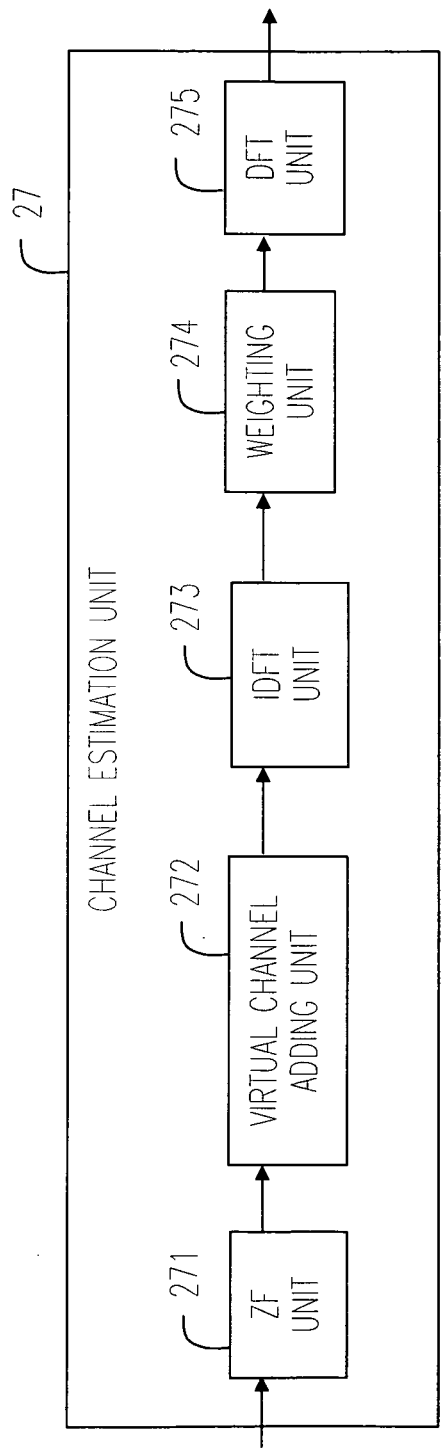
FIG. 4 is a diagram showing a functional configuration of a channel estimation unit.

The channel estimation unit 27 performs a channel estimation on the basis of the pilot signals allocated to the heads of the individual frames in the signals that are output from the DFT unit 24. The channel estimation unit 27 will hereinafter be described in detail with reference to FIG. 4. FIG. 4 is a diagram showing a functional configuration of the channel estimation unit 27. Incidentally, in the following discussion, let x be a signal component corresponding to each subcarrier inputted to the channel estimation unit 27 and y be a channel estimation value that is output from the channel estimation unit 27.

The channel estimation unit 27 includes a ZF unit 271, a virtual channel adding unit 272, an IDFT unit 273, a weighting unit 274, a DFT unit 275, etc.

The ZF unit 271 obtains a temporary CFR estimation value $h_{ZF}$ from the inputted signal x by a zero-forcing. The signal component x corresponding to each of the subcarriers to be inputted can be expressed by the following formula (3) through frequency selective fading, where $x_m$ represents a reception signal about the subcarrier m, $h_m$ represents CFR, $P_m$ shows a pilot signal, and $n_m$ stands for a noise component.

[Mathematical Expression 3]

$$x_m = h_m P_m + n_m \quad \text{Formula (3)}$$

The ZF unit 271 cancels, based on the zero-forcing, the known pilot signal $P_m$ from $x_m$ in the formula (3), and thus obtains the temporary CFR estimation value $h_{ZF}(m)$. The zero-forcing can be expressed by the following formula (4). Note that with respect to the subcarriers m, the pilot signal exists in an interval of the active subcarriers 1 through $N_C$, and zeros (0) are set in an interval of $N_C+1$ through N.

[Mathematical Expression 4]

$$h_{ZF}(m) = \frac{x_m}{P_m} \qquad \text{Formula (4)}$$

Figure 5:
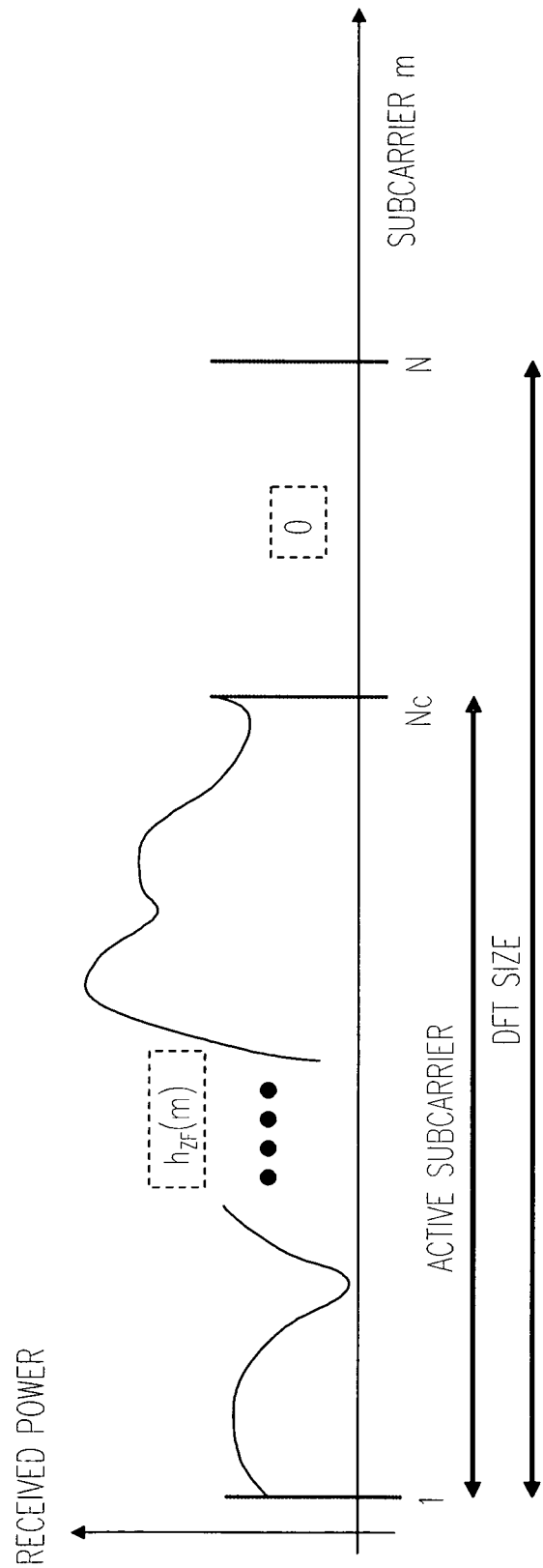
FIG. 5 is a diagram showing frequency spectrums in temporary CFR estimation values.

FIG. 5 illustrates a frequency spectrum about the temporary CFR estimation value $h_{ZF}(m)$ at this time. FIG. 5 is a diagram showing the frequency spectrum in the temporary CFR estimation value. As illustrated in FIG. 5, in the temporary CFR estimation value, none of data exists in the interval of $N_C+1$ through N, and hence a waveform gets discontinuous at both ends of the DFT size. From this point, when executing the IDFT process by use of the temporary CFR estimation value, it follows that a CIR to be obtained has a spread in a time domain.

Accordingly, the virtual channel adding unit 272 generates a virtual CFR estimation value $h_{VCFR}$ in the interval [$N_C+1$ through N] where the data does not originally exist, and adds this generated value to the temporary CFR estimation value $h_{ZF}$ with respect to the subcarrier interval [1 through $N_C$], thereby generating an N-component vector (refer to the following formula (5)).

[Mathematical Expression 5]

$$\xi = (h_{ZF}{}^T, h_{VCFR}{}^T)$$

$$h_{ZF} = (h_{ZF}(1), h_{ZF}(2), \ldots, h_{ZF}(N_C))$$

$$h_{VCFR} = (h_{VCFR}(N_C+1), \ldots, h_{VCFR}(N)) \qquad \text{Formula (5)}$$

Incidentally, a technique of generating the virtual CFR estimation value $h_{VCFR}$ by the virtual channel adding unit 272 will be described later on.

The IDFT unit 273 executes the IDFT process with respect to the generated N-component vector. Through this process, the IDFT unit 273 acquires the CIR in the time domain of an N size. The CIR acquired by the IDFT unit 273 is what restrains the spread in the time domain. The IDFT arithmetic operation herein is given in the following formula (6). The symbol η represents the CIR, $F^+$ indicates an F's complex conjugate transposed matrix, and F stands for a matrix showing the DFT arithmetic operation. Components of the matrix designated by F are given in the following formula (7). In the formula (7), j represents an imaginary unit.

[Mathematical Expression 6]

$$\eta = F^+ \xi \qquad \text{Formula (6)}$$

$$F_{nm} = \frac{1}{\sqrt{N}} \exp\left(2\pi j \frac{nm}{N}\right) \qquad \text{Formula (7)}$$

The weighting unit 274 puts a weight on the CIR obtained by the IDFT unit 273. The weighting unit 274 replaces with zeros the signal components in a region lower than a predetermined threshold value (e.g., an electric power value) retained beforehand in the memory etc. The CIR replaced with zeros by the weighting unit 274 is given in the following formula (8).

[Mathematical Expression 7]

$$\tilde{\eta} = (\eta_1, \eta_2, \eta_3, \ldots, \eta_M, 0, \ldots, 0)^T \qquad \text{Formula (8)}$$

Note that the weighting unit 274 in the embodiment applies the zero-replacement and may also apply other types of weights. The present invention does not restrict the technique of how the CIR is weighted.

The DFT unit 275 executes a DFT process about the thus-weighted CIR, thereby acquiring a CFR estimation value. The DFT process executed at this time is given in the following formula (9). The symbol "T" represents the transposition, and "~" represents the weighted value.

[Mathematical Expression 8]

$$\tilde{\xi} = F\tilde{\eta} = (\tilde{h}^T, \tilde{h}_{VCFR}{}^T)^T \qquad \text{Formula (9)}$$

The DFT unit 275 outputs, as CFR estimation values y, a first value through an $N_C$-th value of the acquired CFR estimation values. The thus-output CFR estimation values y are transferred to the synchronous detection unit 26.

[Mathematical Expression 9]

$$y_m = \tilde{\xi}_k, \ m = 1, 2, \ldots, N_C$$

<<Generation of Virtual CFR Estimation Values $h_{VCFR}$>>

A variety of methods are considered as methods of how the virtual channel adding unit 272 generates the virtual CFR estimation value $h_{VCFR}$. The present invention does not restrict the method of generating the virtual CFR estimation value $h_{VCFR}$, and a premise is that the generated virtual CFR estimation value $h_{VCFR}$ may take any value unless the whole interval [$N_C+1$ to N] originally containing none of any existence of the data comes to the zero-approximation value. Incidentally, for performing the channel estimation with high accuracy by restraining the spread, in the time domain, of the CIR acquired after executing the IDFT process, it is preferable to generate such a virtual CFR estimation value $h_{VCFR}$ that the waveform of the interval [1 to N] gets smoothly continuous.

Figure 6:
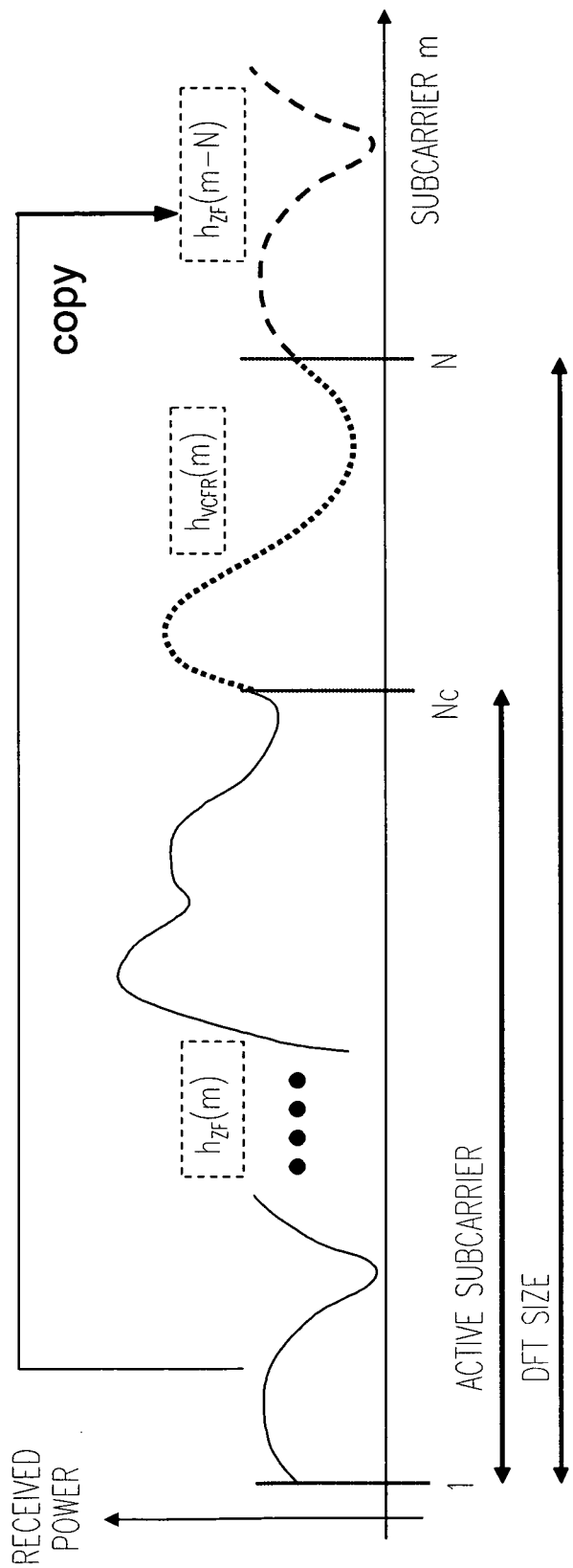
FIG. 6 is a diagram showing a concept of how a virtual CFR estimation value is added.

FIG. 6 is a diagram showing an example of adding the virtual CFR estimation value $h_{VCFR}$. The virtual CFR estimation value $h_{VCFR}$ exemplified in FIG. 6 is that a value in a start position of the DFT is generated as a value in a position (N) shifted by a DFT size from the DFT start position as it is so that the waveform of the interval [$N_C+1$ to N] gets smoothly continuous. The channel estimation using the thus-generated virtual CFR estimation value $h_{VCFR}$ enables the spread, in the time domain, of the CIR acquired after the IDFT process to be restrained and also enables the channel estimation to be conducted with the high accuracy.

Figure 7:
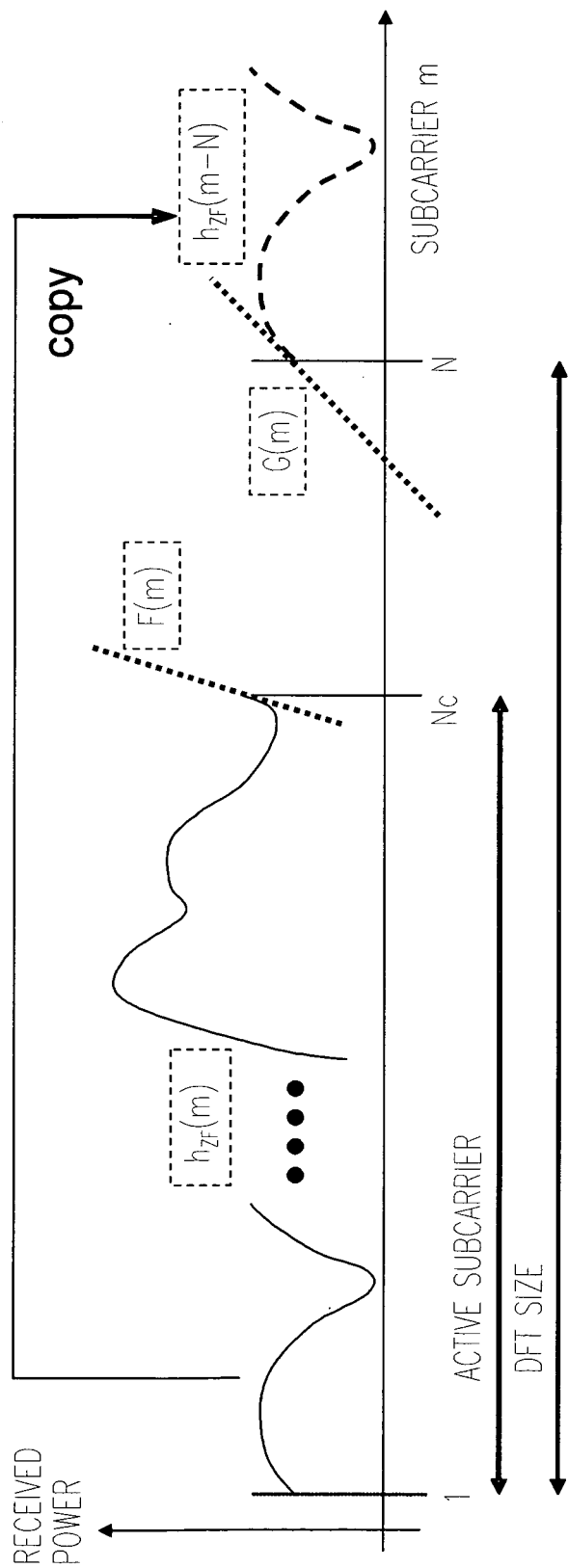
FIG. 7 is a diagram showing a first example of generating a waveform of the virtual CFR estimation value.

The method of generating the virtual CFR estimation value $h_{VCFR}$ getting the waveform of interval [1 to N] smoothly continuous, will hereinafter be described with reference to FIG. 7. FIG. 7 is a diagram showing an example of generating a waveform of the virtual CFR estimation value. The virtual channel adding unit 272 generates the waveform of the virtual CFR estimation value $h_{VCFR}$ as a continuous waveform of which a start point is a temporary CFR estimation value $h_{ZF}(N_C)$ in the subcarrier $N_C$ and of which a terminating point is a temporary CFR estimation value $h_{ZF}(1)$ in the subcarrier 1 as the CFR estimation value in the frequency bandwidth N.

At this time, the virtual channel adding unit 272 generates a straight line F(m) passing through the temporary CFR estimation value $h_{ZF}(N_C)$ in the subcarrier $N_C$ and getting coincident with a gradient of $h_{ZF}(m)$ and generates a straight line G(m) passing through the temporary CFR estimation value $h_{ZF}(1)$ in the frequency bandwidth N and getting coincident with the gradient of $h_{ZF}(m)$. The virtual channel adding unit 272 generates the virtual CFR estimation value $h_{VCFR}$ by applying a predetermined weight to these straight lines F(m) and G(m). The following formula (10) is a formula for generating the virtual CFR estimation value $h_{VCFR}$ at this time. In the formula (10), L denotes a parameter constant, which can be adjusted based on the number of the subcarriers used for the communications. The parameter constant L may be stored previously in the memory etc.

[Mathematical Expression 10]

$$h_{VCFR}(m) = \frac{1}{2}\left(1 + \cos\left(\frac{\pi(m - Nc)}{L}\right)\right) \cdot \theta\left(\frac{m - Nc}{L}\right) \cdot$$

$$F(m)\frac{1}{2}\left(1 + \cos\left(\frac{\pi(m - N + 1)}{L}\right)\right) \cdot \theta\left(\frac{m - N + 1}{L}\right) \cdot G(m)$$

$$\theta(t) = \begin{cases} 1 & |t| \leq 1 \\ 0 & |t| > 1 \end{cases}$$

Formula (10)

Note that the straight lines F(m) and G(m) have been described as those coincident with the gradient $h_{ZF}(m)$, which means that a highly acceptable effect is acquired in this case, however, independent straight lines not getting coincident therewith may also, as a matter of course, be available.

Next, an example of the generating method of getting the straight lines F(m) and G(m) coincident with the gradient of $h_{ZF}(m)$, will be explained. The following generating method enables the gradient of each of the straight lines F(m) and G(m) to get coincident with the gradient of $h_{ZF}(m)$. In this case, the straight lines F(m) and G(m) are obtained by use of a predetermined count of values (a sample count $N_{est}$) in the vicinity of the subcarrier $N_C$ serving as the start point of the virtual CFR estimation value $h_{VCFR}$ and in the vicinity of the frequency bandwidth N (a copy of the subcarrier 1) serving as the terminating point thereof.

Figure 8:
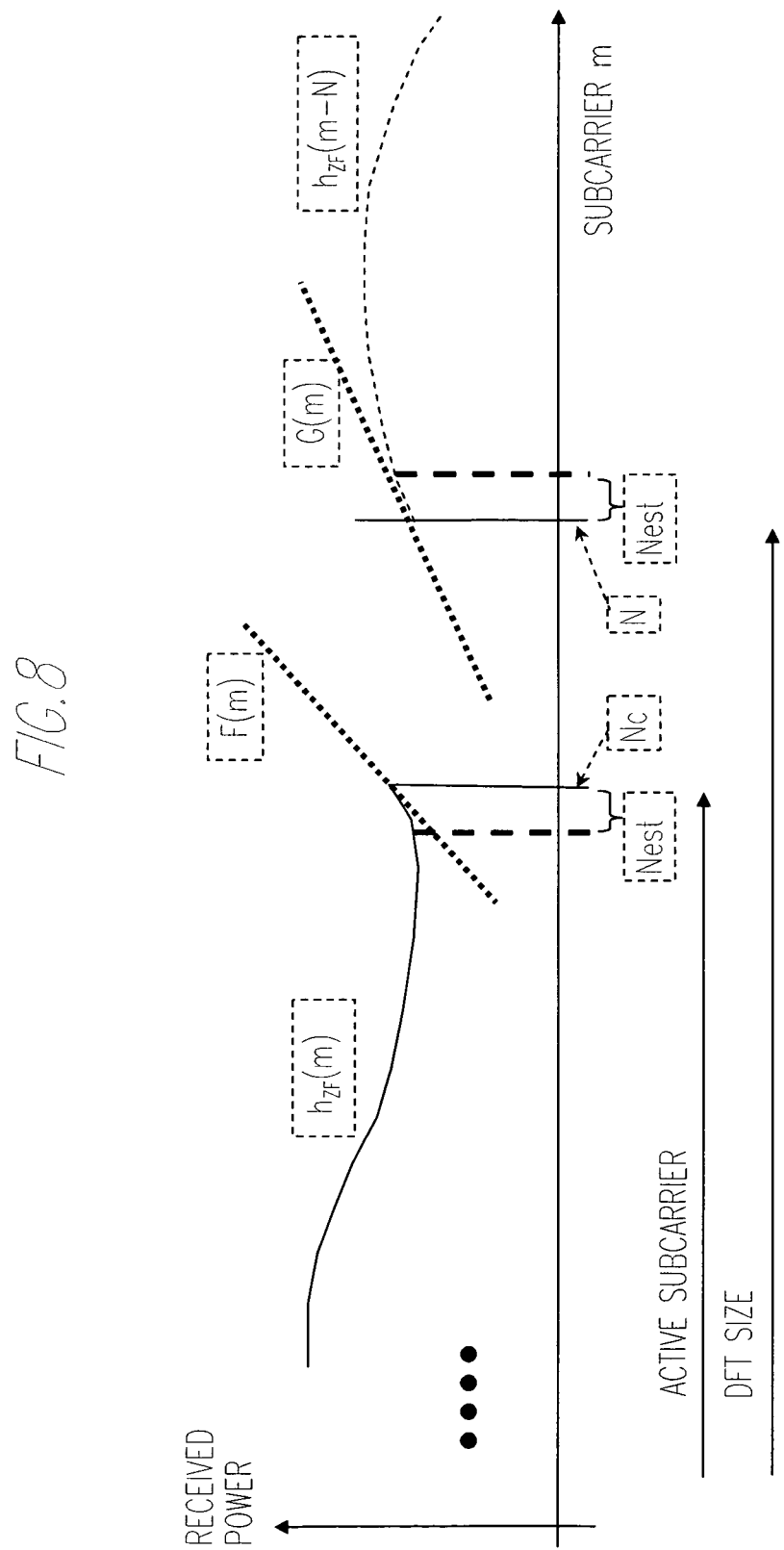
FIG. 8 is a diagram showing a second example of generating the waveform of the virtual CFR estimation value.

FIG. 8 is a diagram illustrating an example of generating the waveform of the virtual CFR estimation value by use of the sample count $N_{est}$. A mathematical expression at that time is given in the following formula (11). The sample count $N_{est}$ is a parameter constant and may be adjusted based on a subcarrier count, a communication environment, etc. The sample count $N_{est}$ may also be stored beforehand in the memory etc.

[Mathematical Expression 11]

$$F(m) = (m - N_c)a + b$$

$$G(m) = (m - N + 1)c + d$$

$$a = \frac{1}{N_{est}} \sum_{i=N_c-N_{est}+1}^{N_c} (h_{ZF}(i) - h_{ZF}(i-1))$$

$$b = \frac{1}{N_{est}} \sum_{i=N_c-N_{est}+1}^{N_c} h_{ZF}(i) + \frac{N_{est}}{2}a$$

$$c = \frac{1}{N_{est}} \sum_{i=1}^{N_{est}} (h_{ZF}(i+1) - h_{ZF}(i))$$

$$d = \frac{1}{N_{est}} \sum_{i=1}^{N_{est}} h_{ZF}(i) - \frac{N_{est}}{2}c$$

Formula (11)

Figure 9:
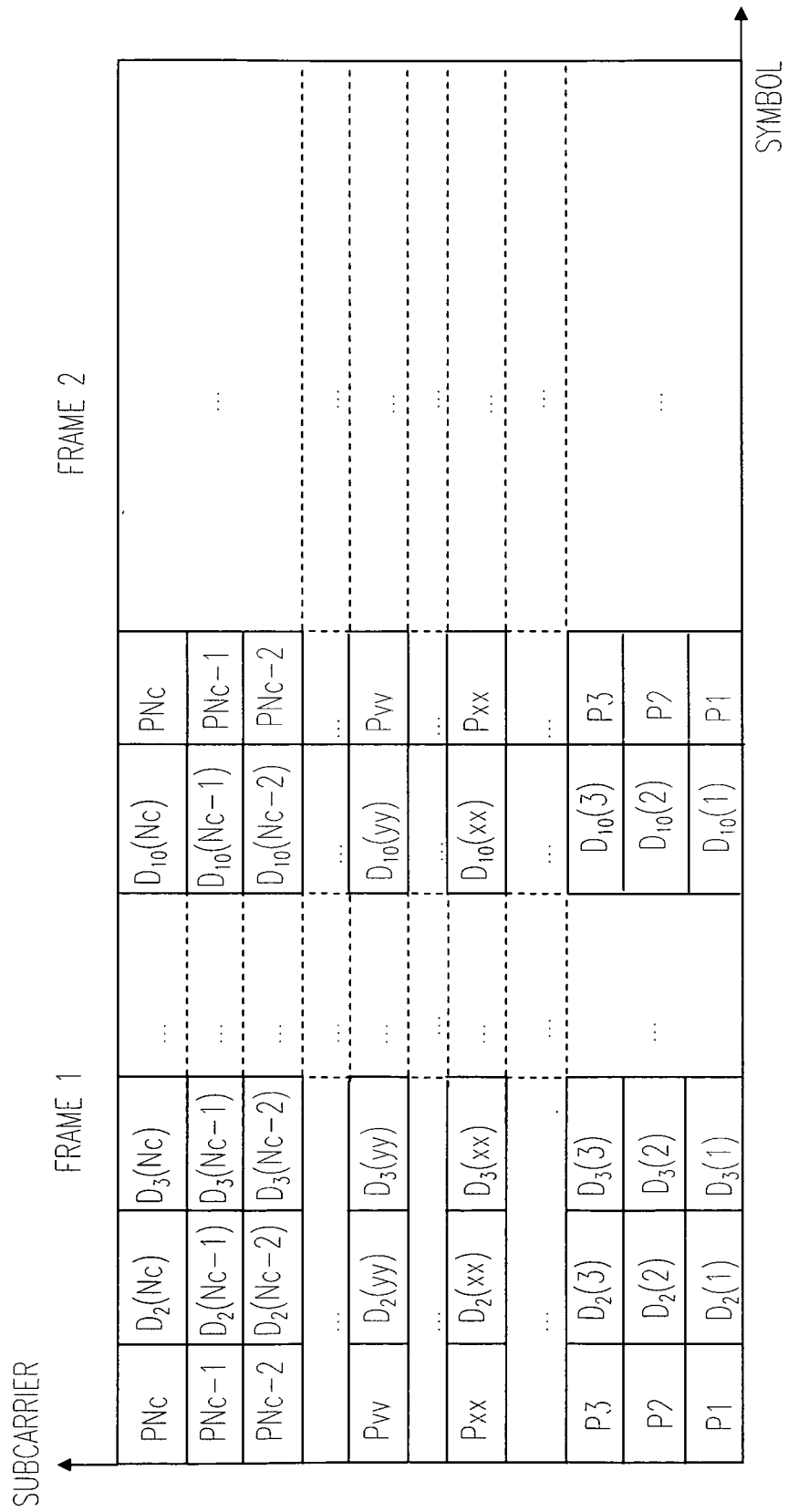
FIG. 9 is a diagram showing a modified example of the structure of the OFDM frame.

As described above, in the case of generating the waveform of the virtual CFR estimation value by employing the sample count, an available scheme is that the pilot signals are allocated at a high density in the periphery of the subcarriers in the bandwidth having a small frequency and in the periphery of the subcarriers in a bandwidth having a large frequency among the $N_C$-pieces of subcarriers and further allocated in the subcarriers other than those at a density lower than the above density (see FIG. 9).

With this scheme, the waveform of the virtual CFR estimation value can be smoothly generated, further an inserting frequency of the pilot signals is decreased with the result that the should-be-transmitted data symbols can be increased to a degree of that decrease, and hence the frequency availability efficiency can be raised.

Operational Example

Figure 10:
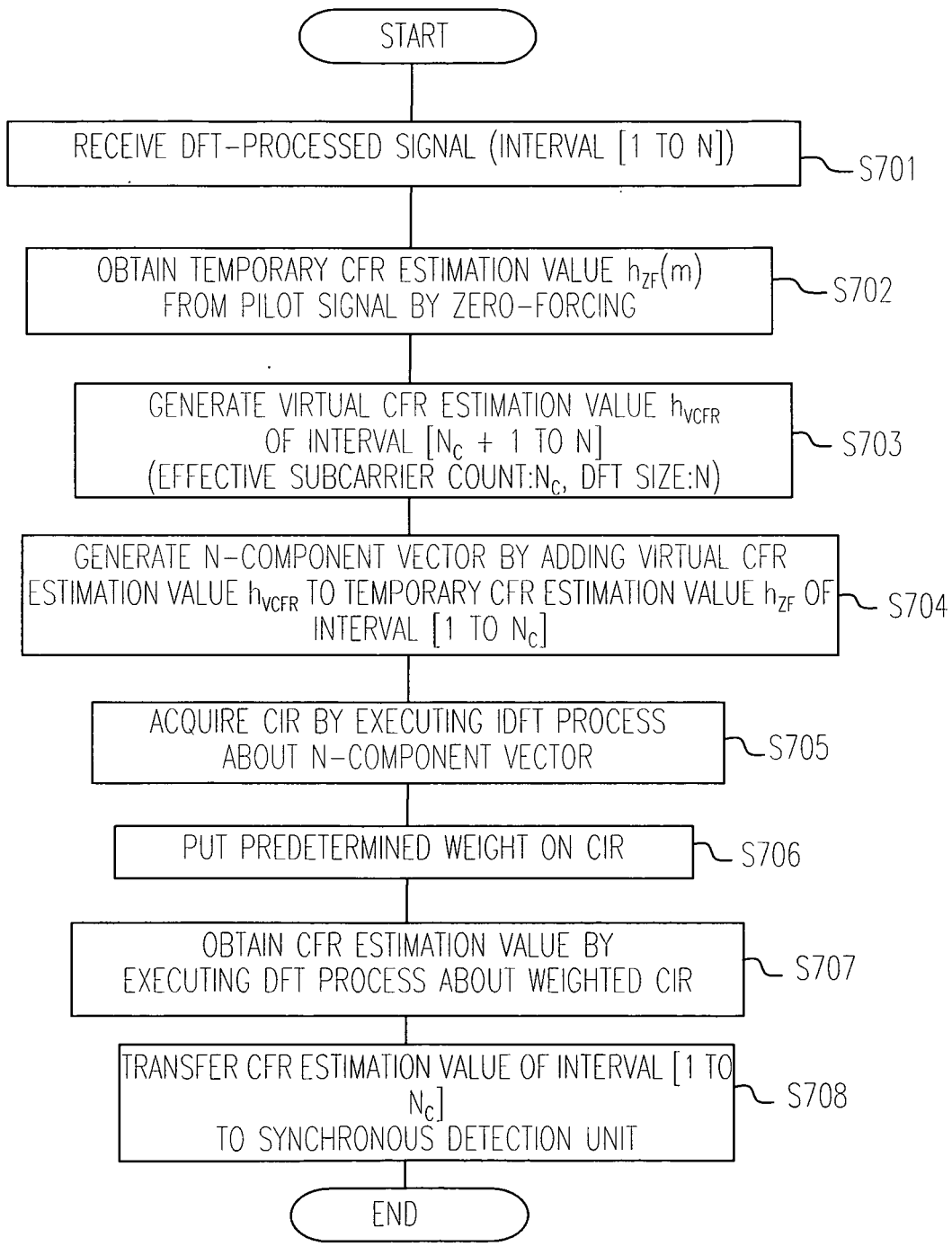
FIG. 10 is a diagram showing a channel estimation processing flow.

Next, an operational example of the communication device in the embodiment of the present invention will hereinafter be described with reference to FIG. 10. FIG. 10 is a diagram showing a channel estimation processing flow in the embodiment.

The radio transmission frequency signals received by the antenna element are converted into the baseband signals (by the downconversion unit 21), then converted into the digital signals (by the A/D converting unit 22) and converted into the parallel signals of N-samples (by the S/P converting unit 23). At this time, the guard intervals (GIs) are removed from the signals. The parallel signals undergo the DFT process, and N-pieces of signal corresponding to the subcarrier components are output (by the DFT unit 24). At this time, among the N-pieces of output signals, the [1 to $N_C$] pieces of signals correspond to the pilot signals, and the ($N_C$+1 to N) pieces of signals correspond to the zero signals set by the transmitting device.

The channel estimation unit 27, upon receiving the N-pieces of signals output from the DFT unit 24 (S701), transfers the received signals to the ZF unit 271.

The ZF unit 271 acquires the temporary CFR estimation value $h_{ZF}(m)$ from the inputted signals by the zero-forcing (S702). At this time, in the thus-acquired temporary CFR estimation value $h_{ZF}(m)$, the value of the interval [$N_C$+1 to N] is in the state where the data does not exist. The acquired temporary CFR estimation value $h_{ZF}(m)$ is transferred to the virtual channel adding unit 272.

The virtual channel adding unit 272 generates the virtual CFR estimation value $h_{VCFR}$ in the interval [$N_C$+1 to N] where the data does not originally exist so that the waveform of the whole interval [1 to N] gets smoothly continuous (S703). The virtual channel adding unit 272 adds the virtual CFR estimation value $h_{VCFR}$ to the temporary CFR estimation value $h_{ZF}$ with respect to the subcarrier interval [1 through $N_C$], thereby generating the N-component vector (S704). The N-component vector is transferred to the IDFT unit 273.

The IDFT unit 273 executes the IDFT process with respect to the generated N-component vector (S705). Through this process, the IDFT unit 273 acquires the CIR in the time domain of the N size. The CIR acquired by the IDFT unit 273 is what restrains the spread in the time domain. The CIR is transferred to the weighting unit 274.

The weighting unit 274 applies a predetermined weight to the CIR acquired by the IDFT unit 273 (S706). The predetermined weight may be applied in a way that makes, e.g., the zero-replacement of the signal component in the area lower than the predetermined threshold value. The weighted CIR is transferred to the DFT unit 275.

The DFT unit 275 executes the DFT process about the weighted CIR, thereby acquiring the CFR estimation values (S707). The DFT unit 275 transfers, as CFR estimation values, the [1–$N_C$]-th values among the acquired CFR estimation values to the synchronous detection unit 26 (S708).

The synchronous detection unit 26 executes the synchronous detection of the inputted serial signal sequence by use of the channel estimation values transferred from the channel estimation unit 27.

Operation/Effect in Embodiment

In the communication device (the receiving device) in the embodiment, the virtual CFR estimation value $h_{VCFR}$, which gets the waveform of the interval [1 to N] smoothly continuous, is generated in terms of carrying out the channel estimation with the high accuracy. The virtual CFR estimation value $h_{VCFR}$ is generated as the estimation value corresponding to the frequency bandwidth where the data does not originally exist, i.e., the frequency bandwidth interval ($N_C$ to N) that is not used for the communications.

The virtual CFR estimation value $h_{VCFR}$ is generated in consideration of the waveform shaped by the virtual CFR estimation value on the frequency axis. Based on the straight line F(m) passing through the temporary CFR estimation value $h_{ZF}(N_C)$ in the subcarrier $N_C$ and getting coincident with the gradient of $h_{ZF}(m)$ and the straight line G(m) passing through the temporary CFR estimation value $h_{ZF}(1)$ in the frequency bandwidth N and getting coincident with the gradient of $h_{ZF}(m)$, the waveform of the virtual CFR estimation value is generated by applying a predetermined weight to these straight lines F(m) and G(m).

Further, the gradients of the straight lines F(m) and G(m) are determined based on the temporary CFR estimation values $h_{ZF}$ of a predetermined sample count $N_{est}$ from the subcarrier defined as the start point or the terminating point of the virtual CFR estimation value $h_{VCFR}$.

Figure 12:
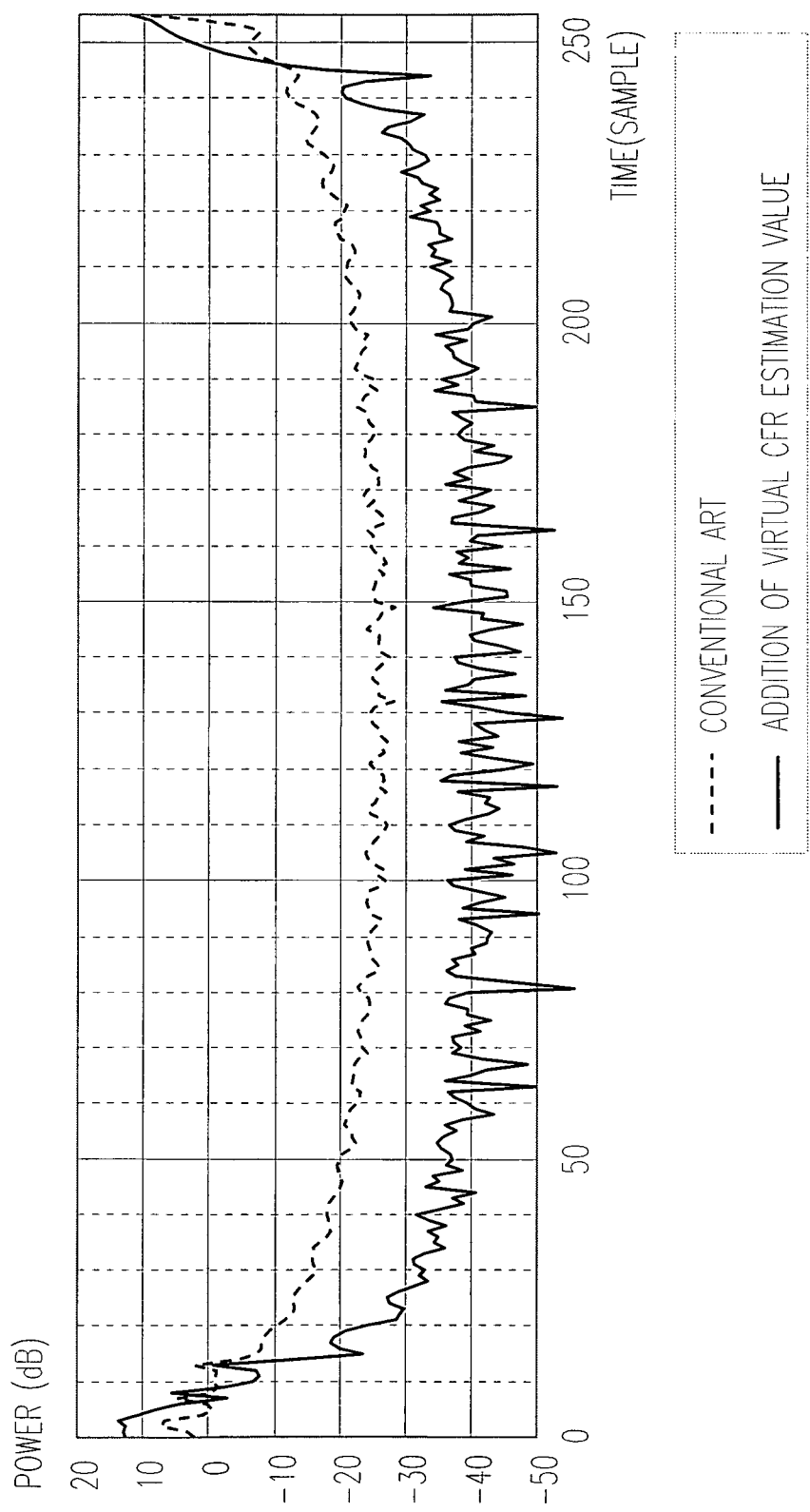
FIG. 12 is a diagram showing a CIR distribution when performing the channel estimation in the embodiment.

Thus, according to the embodiment, there is generated the virtual CFR estimation value with respect to the frequency bandwidth where the data does not originally exist, i.e., the frequency bandwidth that is not used for the communications, then the CFR estimation value containing this virtual CFR estimation value undergoes the IDFT process, and it is therefore feasible to restrain the spread, in the time domain, of the CIR acquired after the IDFT process. FIG. 12 shows a result of this process. FIG. 12 is a diagram showing a distribution of the CIRs after the IDFT process in the channel estimation according to the embodiment. As illustrated in FIG. 12, the method depicted by a solid line according to the embodiment shows a less sample count on the time-base, which represents the high electric power, than by the conventional method depicted by a dotted line.

It is therefore feasible to reduce the signal components affected by the process such as putting the weight on the CIR in the subsequent process and to generate, if set back again to the information of the frequency domain, the channel estimation value with the high accuracy.

First Modified Example

Figure 11:
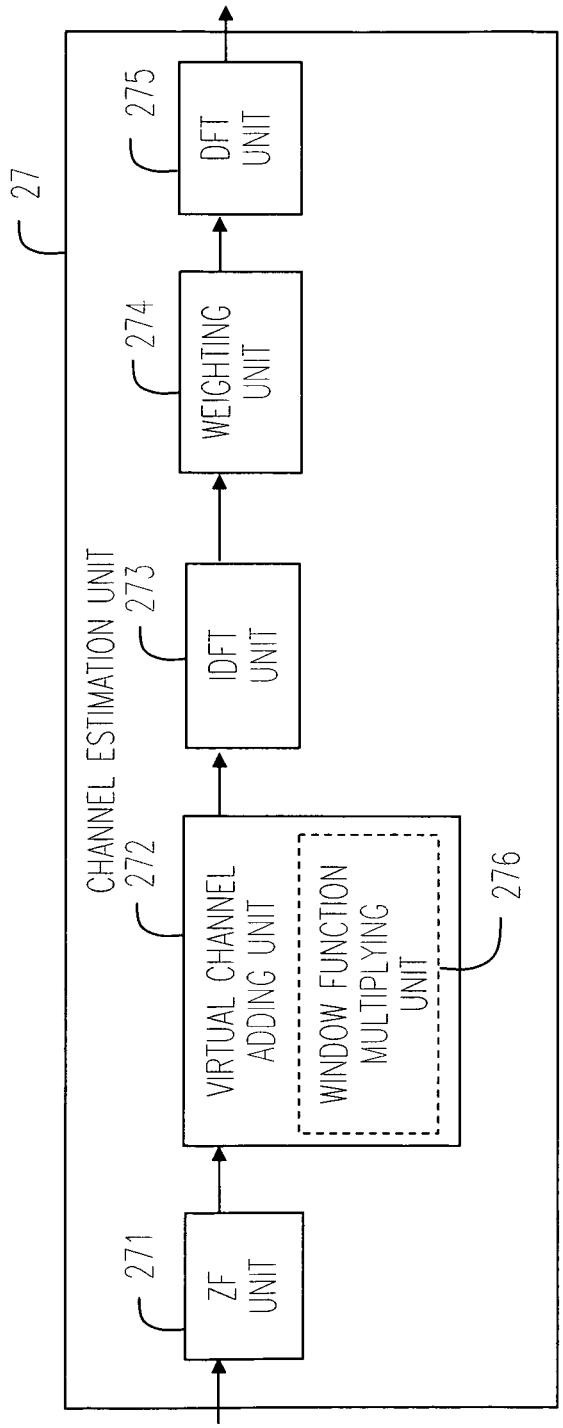
FIG. 11 is a diagram showing a configuration of the channel estimation unit in the modified example.

In the receiving device according to the embodiment discussed above, the IDFT unit 273 executes the IDFT process about the N-component vector, given in the formula (5), generated by the virtual channel adding unit 272, however, the virtual channel adding unit 272 may further multiply the N-component vector by a window function (refer to the formula (12)). FIG. 11 illustrates a configuration of the channel estimation unit in this modified example. FIG. 11 is a diagram showing the configuration of the channel estimation unit in the first modified example. In this case, a window function multiplying unit 276 executes the processes related to the following formulae (12) through (14).

[Mathematical Expression 12]

$$\xi_{Wm} = w_m \xi_m \qquad \text{Formula (12)}$$

Herein, particularly the window function is not limited, however, for example, in the case of using a Hanning window function, the following formula (13) is employed. The symbol Q in the formula (13) denotes a parameter constant and may be stored previously in the memory etc.

[Mathematical Expression 13]

$$w_m = \frac{1}{2}\left(1 + \cos\left(\frac{\pi m}{Q}\right)\right) \text{ for } |m| \le Q \qquad \text{Formula (13)}$$

Further, a window function with $N_C/2$ being centered may also be used. In this case, when $N_C+(N-N_C)/2 \le m < N$, the virtual CFR estimation value having a continuous connection to the vicinity of m=1 is added, and hence the multiplication of the window function given in the following formula (14) is done so as not to lose the continuity.

[Mathematical Expression 14]

$$w_m = \frac{1}{2}\left(1 + \cos\left(\frac{\pi(m - Nc/2)}{Q}\right)\right) \text{ for} \qquad \text{Formula (14)}$$

$$1 \le m < Nc + \frac{(N - Nc)}{2}$$

$$w_m = \frac{1}{2}\left(1 + \cos\left(\frac{\pi(N + Nc/2 - m)}{Q}\right)\right) \text{ for}$$

$$Nc + \frac{(N - Nc)}{2} \le m < N$$

In this case, the DFT unit 275 further cancels the window function from the $[1-N_C]$-th values among the acquired CFR estimation values, and outputs the obtained value as the CFR estimation value y (refer to the formula (15)).

[Mathematical Expression 15]

$$y_m = \frac{\tilde{\xi}_m}{w_m}, m = 1, 2, \ldots, N_c \qquad \text{Formula (15)}$$

Further, the first modified example described above has the scheme that the virtual channel adding unit 272 further multiplies the N-component vector by the window function, however, and another available scheme is that the temporary CFR estimation value $h_{ZF}$ given from the ZF unit 271 is multiplied by the window function, and the virtual CFR estimation value is generated based on this multiplied result.

Second Modified Example

Figure 13:
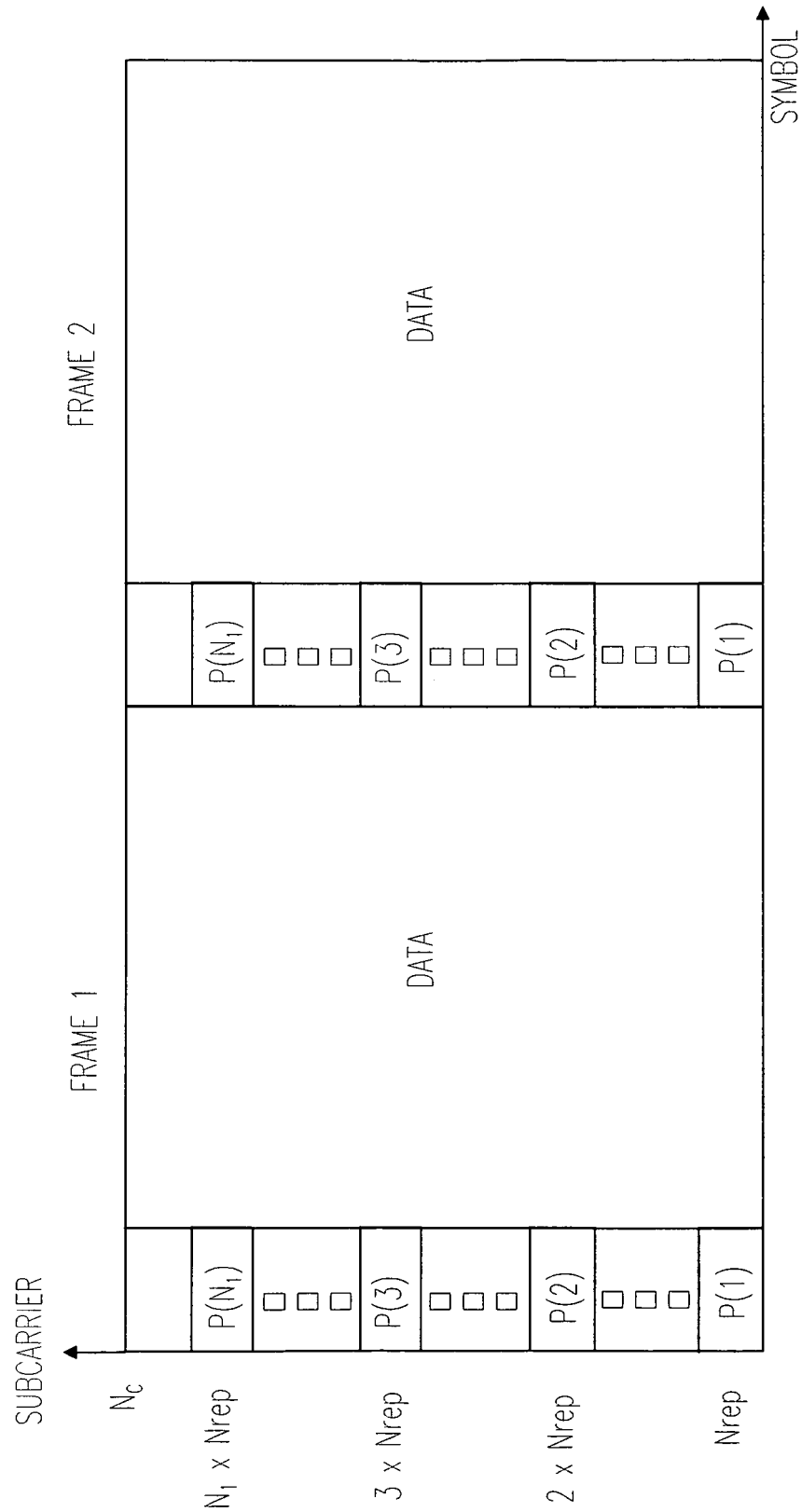
FIG. 13 is a diagram showing an example of the structure of the OFDM frame in a second modified example.
Figure 14:
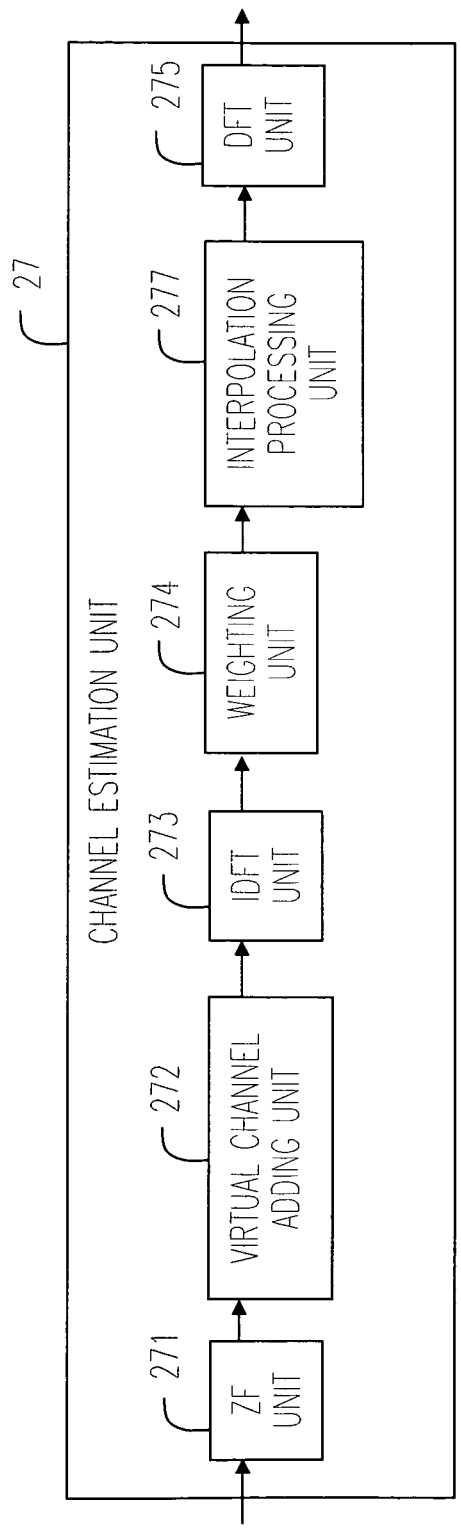
FIG. 14 is a diagram showing a configuration of the channel estimation unit in the second modified example.

The embodiment discussed above has exemplified the case in which the pilot signals are allocated to all the subcarriers as shown in FIG. 2. The receiving device in an example (which will hereinafter be termed a second modified example), where the pilot signals are allocated not to all the subcarriers but otherwise to the subcarriers, will hereinafter be described with reference to FIGS. 13 and 14. FIG. 13 is a diagram showing a structure of an OFDM frame in the second modified example. FIG. 14 is a diagram showing a configuration of the channel estimation unit in the second modified example.

A scheme in the second modified example is that only one pilot signal is allocated to $N_{rep}$-pieces of subcarriers. To be specific, the pilot signals P(1), P(2), P(3), ..., P(k), ..., P($N_1$) are allocated to the subcarriers. Herein, $N_1$ represents the number of pilot signal to be allocated.

The channel estimation unit 27 in the second modified example is provided, in addition to those in the embodiment described above, further with an interpolation processing unit 277. An operation of the channel estimation unit 27 in the second modified example will hereinafter be explained with reference to FIG. 14.

Let $x_{kNrep}$ be the signal inputted to the ZF unit 271 and $P_{kNrep}$ be the known pilot signal in the subcarrier, the temporary CFR estimation value $h_{ZF}(k)$ acquired by the ZF unit 271 is given in the following formula (16).

[Mathematical Expression 16]

$$h_{ZF}(k) = \frac{x_{kNrep}}{P_{kNrep}} \quad (k = 1, 2, \ldots, N_1) \quad \text{Formula (16)}$$

The virtual channel adding unit 272, upon receiving the temporary CFR estimation value $h_{ZF}(k)$, generates the virtual CFR estimation value $h_{VCFR}$ having a value of M−N$_1$ by use of "M" given such as M=2$^m$>N$_1$. The virtual channel adding unit 272 generates an M-component vector (refer to the following formula (17)) by adding the thus-generated virtual CFR estimation value $h_{VCFR}$ to the temporary CFR estimation value $h_{ZF}(k)$.

[Mathematical Expression 17]

$$\xi_M = (h_{ZF}^T, h_{VCFR}^T)^T$$

$$h_{ZF} = (h_{ZF}(1), h_{ZF}(2), \ldots, h_{ZF}(N_1))$$

$$h_{VCFR} = (h_{VCFR}(N_1+1), \ldots, h_{VCFR}(M)) \quad \text{Formula (17)}$$

The method of generating the virtual CFR estimation value $h_{VCFR}$ is the same as in the embodiment discussed above.

Thereafter, the IDFT unit 273 executes the IDFT process about the generated M-component vector. Through this process, the IDFT unit 273 obtains the CIR in an M-size time domain. Herein, the IDFT arithmetic operation is shown in the following formula (18). The symbol $\eta_M$ represents the CIR, $F_M^+$ denotes a complex conjugate transposed matrix of $F_M$, and $F_M$ stands for a matrix showing the DFT arithmetic operation in the M-size.

[Mathematical Expression 18]

$$\eta_M = F_M^+ \xi_M \quad \text{Formula (18)}$$

The weighting unit 274 weights the CIR obtained by the IDFT unit 273. The weighting process may be done in a way that multiplies such a predetermined weight as to cancel the noise component or utilizes the zero-replacement using a predetermined threshold value, and so on. Herein, let $W_M$ be a weight coefficient and $g_M$ be a signal obtained by the weighting unit 274, and $g_M$ is given in the following formula (19)

[Mathematical Expression 19]

$$g_M = W_M \eta_M \quad \text{Formula (19)}$$

The interpolation processing unit 277 organizes the signals $g_M$ acquired by the weighting unit 274 into N-component signals $g_N$ by inserting zeros (0) in proper positions of a M-component sequence of the signals $g_M$ (refer to the formula (20)). The present invention does not restrict the zero inserting positions with respect to the process by the interpolation processing unit 277, however, as shown in the formula (20), the CFR estimation value with the high accuracy can be acquired by inserting zeros in the vicinity of the center of the components of the signals $g_M$.

[Mathematical Expression 20]

$$g_N = (g_{M,1}, \ldots, g_{M,M/2}, 0, \ldots, 0, g_{M,M/2+1}, \ldots, g_{M,M}) \quad \text{Formula (20)}$$

The DFT unit 275 carries out the DFT process about the N-size time-base signals $g_N$ interpolated by the interpolation processing unit 277, thereby acquiring the CFR estimation values. The DFT unit 275 outputs, as the CFR estimation values y, the [1−N$_C$]-th values among the acquired CFR estimation values.

With this operation, the receiving device in the second modified example can, in the frame structure where the pilot signals are allocated not to all the subcarriers but otherwise to the subcarriers, acquire the channel estimation values of all the subcarriers. Incidentally, even such a scheme that the weight coefficient $W_M$ processed by the weighting unit 274 is set to "1" and none of the weighting process is carried out, enables the interpolating process to be executed more accurately than by the conventional interpolating process.

Third Modified Example

In the embodiment discussed above, the channel estimation unit 27 having the configuration illustrated in FIG. 4, executes the IDFT process (by the IDFT unit 273), the weighting process (by the weighting unit 274) and the DFT process (by the DFT unit 275) about the N-component vector (the CFR estimation value $h_{VCFR}$, the temporary CFR estimation value $h_{ZF}$) output from the virtual channel adding unit 272, and outputs the resultantly-acquired CFR estimation values y to the synchronous detection unit 26.

The IDFT process, the weighting process and the DFT process can be, however, mathematically expressed by way of the matrix operations. Hence, an available scheme is that the matrix used for the matrix operation is defined as a weight matrix, and a function unit for multiplying the weight matrix replaces the IDFT unit 273, the weighting unit 274 and the DFT unit 275 in the embodiment discussed above. A weight matrix U in this case can be given as in the formula (21). Herein, as to the symbols, F, W and F$^+$, in the same way as defined in the embodiment discussed above, F$^+$ represents the F's complex conjugate transposed matrix, F denotes the matrix showing the DFT arithmetic operation, and W stands for the matrix showing the weighting arithmetic operation.

[Mathematical Expression 21]

$$U = FWF^+ \quad \text{Formula (21)}$$

Figure 15:
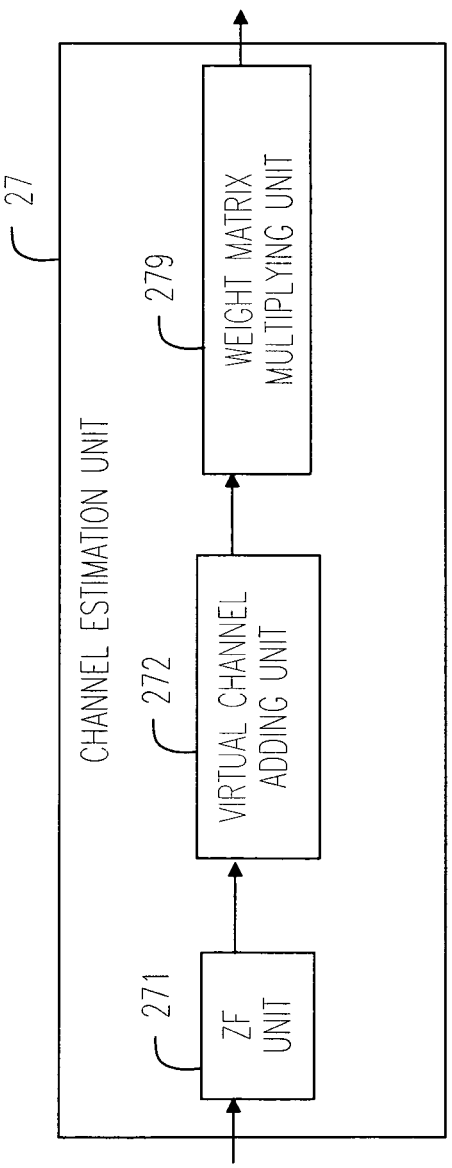
FIG. 15 is a diagram showing a configuration of the channel estimation unit in a third modified example.

FIG. 15 shows a functional configuration of the channel estimation unit in the third modified example. FIG. 15 is a diagram showing the functional configuration of the channel estimation unit in the third modified example. The channel estimation unit 27 in the third modified example is constructed of the ZF unit 271, the virtual channel adding unit 272, a weight matrix multiplying unit 279, etc.

The weight matrix multiplying unit 279 multiplies the N-component vector received from the virtual channel adding unit 272 by a weight matrix defined as a substitute for the IDFT process, the weighting process and the DFT process, and outputs the CFR estimation value y. Herein, the calculation process by the weight matrix multiplying unit 279 may be, in the case of using, e.g., a Toeplitz matrix as the weight matrix, organized by a convolution integral process or a moving average process, which are based on a configuration of an FIR filer and so on.

The weight matrix U used in the weight matrix multiplying unit 279 may be not the matrix U given in the formula (21) described above but the matrix given in the following formula (22). The weight matrix U given in the formula (22) is an N-row/N-column matrix, where the respective components are designated by $U_{n,m}$.

[Mathematical Expression 22]

$$\begin{cases} U_{n,n-1} = U_{n,n} = U_{n,n+1} = 1 & \text{for } n \in [2, N_c - 1] \\ 2U_{n,N} = U_{n,n} = U_{n,n+1} = 1 & \text{for } n = 1 \\ U_{n,n-1} = U_{n,n} = 2U_{n,n+1} = 1 & \text{for } n = N_c \\ U_{n,m} = 0 & \text{for } n, m = \text{other} \end{cases} \quad \text{Formula (22)}$$

The weight matrix given in the formula (22) has such a structure that this weight matrix can not be decomposed by the matrices representing the IDFT process, the weighting process and the DFT process. Accordingly, the weight matrix U in this case can not be expressed as by the formula (21).

In this weight matrix U, however, the arithmetic operation corresponding to the subcarriers n=2 to $N_C-1$ expresses the convolution integral, and therefore, with respect to the value to be output, the same effect as in the embodiment discussed above is acquired.

The third modified example using this type of weight matrix U proves that the present invention, in the process by the channel estimation unit 27 as in the embodiment discussed above, does not restrict the process executed about the N-component vector output from the virtual channel adding unit 272.

What is claimed is:

1. A communication device, comprising:
   a receiver that receives a multicarrier signal having a plurality of subcarriers including frequency bands used for transmitting data and pilot signals, wherein a guard interval is provided after the end of the plurality of subcarriers; and
   a processor that performs channel estimating processes including,
   generating temporary channel estimation values from pilot signals located in the frequency bands, based on known information on the pilot signals;
   generating a virtual channel estimation value sequence to be located on the guard interval, based on the generated temporary channel estimation values corresponding to the frequency bands included in the multicarrier signal;
   generating a channel estimation value sequence corresponding to a predetermined frequency bandwidth by combining the generated virtual channel estimation value sequence with the plurality of temporary channel estimation values; and
   generating channel estimation values related to any ones of the plurality of subcarriers by use of the channel estimation value sequence, and
   the processor generates the virtual channel estimation value sequence so that the channel estimation value sequence corresponding to the predetermined frequency bandwidth has substantially-coincident channel estimation values with respect to maximum and minimum frequency bands in the channel estimation value sequence, and forms a waveform that is smoothly continuous on the whole on a frequency-axis.

2. The communication device according to claim 1, wherein the channel estimating processes further including,
   frequency-time-converting the channel estimation value sequence into channel impulse response information in a time domain; and
   executing a predetermined weighting process and/or a predetermined correcting process with respect to the channel impulse response information,
   wherein the channel estimation values related to any ones of the plurality of subcarriers are generated by time-frequency-converting the processed channel impulse response information.

3. The communication device according to claim 1, wherein the processor sets, as start points, the temporary channel estimation values of the maximum and minimum frequency bands of the corresponding subcarriers in the plurality of temporary channel estimation values on the frequency-axis, then generates two tangential lines extending in directions of the frequency bands other than the frequency bands of the plurality of subcarriers, and generates the virtual channel estimation value sequence so that virtual channel estimation values are arranged on the waveform generated by multiplying the two generated tangential lines by a window function.

4. The communication device according to claim 3, wherein the processor obtains respective gradients of the tangential lines based on the temporary channel estimation values within the predetermined frequency bandwidth on the frequency-axis from the respective start points.

5. The communication device according to claim 1, wherein the pilot signals are allocated to the subcarriers having the frequency bands in the vicinity of the minimum and maximum frequency bands at a larger rate than the subcarriers having the intermediate frequency bands in the frequency bands of the plurality of subcarriers.

6. The communication device according to claim 4, wherein the pilot signals are allocated to the subcarriers having the frequency bands within the predetermined frequency bandwidth counted from the minimum and maximum frequency bands at a larger rate than the subcarriers having the intermediate frequency bands in the frequency bands of the plurality of subcarriers.

7. The communication device according to claim 2, wherein the processor executes, as the predetermined weighting process, a zero-replacement process of deeming, as a noise component, a sample of which power corresponding to the channel impulse response information is smaller than a predetermined threshold value and removing the noise component, and executes, as the predetermined correcting process, a process of adding zeros to a predetermined area, on the time-axis, of the channel impulse response information.

8. The communication device according to claim 2, wherein the channel estimating processes further including,
   multiplying the plurality of temporary channel estimation values by a window function,
   wherein the channel estimation value sequence corresponding to the predetermined frequency bandwidth is generated by combining the generated virtual channel estimation value sequence with a result of the multiplication.

9. The communication device according to claim 2, wherein the processor multiplies the channel estimation value sequence, by the window function, and frequency-time-converts a result of the multiplication into the channel impulse response information in the time domain.

10. A channel estimation method in a communication device receiving a multicarrier signal having a plurality of subcarriers including frequency bands used for transmitting data and pilot signals, wherein a guard interval is provided after the end of the plurality of subcarriers, the channel estimation method, comprising:
    generating temporary channel estimation values from pilot signals located in the frequency bands, based on known information on the pilot signals;

generating a virtual channel estimation value sequence to be located on the guard interval, based on the generated temporary channel estimation values corresponding to the frequency bands included in the multicarrier signal;

generating a channel estimation value sequence corresponding to a predetermined frequency bandwidth by combining the generated virtual channel estimation value sequence with the plurality of temporary channel estimation values; and generating channel estimation values related to any ones of the plurality of subcarriers by use of the channel estimation value sequence, wherein the virtual channel estimation value sequence is generated so that the channel estimation value sequence corresponding to the predetermined frequency bandwidth has substantially-coincident channel estimation values with respect to maximum and minimum frequency bands in the channel estimation value sequence, and forms a waveform that is smoothly continuous on the whole on a frequency-axis.

11. The channel estimation method according to claim 10, further comprising:

frequency-time-converting the channel estimation value sequence into channel impulse response information in a time domain; and executing a predetermined weighting process and/or a predetermined correcting process with respect to the channel impulse response information, wherein the channel estimation values related to any ones of the plurality of subcarriers are generated by time-frequency-converting the processed channel impulse response information.

* * * * *